United States Patent

[11] 3,620,389

| [72] | Inventor | Fredrik Munck<br>Bergen, Norway |
|---|---|---|
| [21] | Appl. No. | 3,290 |
| [22] | Filed | Jan. 16, 1970 |
| [45] | Patented | Nov. 16, 1971 |
| [73] | Assignee | Sverre Munck A/S. |
| [32] | Priority | Feb. 24, 1967 |
| [33] | | Norway |
| [31] | | 167,018 |
| | | Continuation-in-part of application Ser. No. 707,252, Feb. 21, 1968, now abandoned. This application Jan. 16, 1970, Ser. No. 3,290 |

[54] SYSTEM FOR TRANSPORTING GOODS TO AND FROM STORAGE SHELVES
5 Claims, 3 Drawing Figs.

[52] U.S. Cl. .................................................. 214/16.4 A,
214/730
[51] Int. Cl. .......................................................... B65g 1/06
[50] Field of Search ............................................ 214/16.4 R,
16.4 A, 16 B, 730

[56] References Cited
UNITED STATES PATENTS

| 2,815,133 | 12/1957 | Asheim et al. | 214/16.1 (8-B) |
| 3,049,247 | 8/1962 | Lemelson | 214/16.4 A |
| 3,240,364 | 3/1966 | Kapnek et al. | 214/730 X |
| 3,279,626 | 10/1966 | DeRoumefort | 214/16.1 (4) |
| 3,390,791 | 7/1968 | Baldwin et al. | 214/16.1 (4-C) |
| 3,445,009 | 5/1969 | Burch | 214/16.4 B |
| 3,536,209 | 10/1970 | Burch | 214/16.4 B |
| 3,507,406 | 2/1970 | Zollinger | 214/16.4 A |

FOREIGN PATENTS

| 1,178,609 | 12/1958 | France | 214/16.4 A |
| 446,825 | 5/1936 | Great Britain | 214/16 A |
| 992,513 | 5/1965 | Great Britain | 214/16.1 (4B) |

*Primary Examiner*—Gerald M. Forlenza
*Assistant Examiner*—Raymond B. Johnson
*Attorney*—Larson, Taylor and Hinds ABSTRACT: A system for transporting goods, e.g., pallets, containers or the like, to and from storage shelves arranged in parallel rows includes a transport carriage movable in guide rails along a path perpendicular to the shelves, the rows of shelves being located on both sides of this path. The transport device includes a platform arrangement which may be raised and lowered and moved laterally of the carriage to effect loading and unloading. A receiving device is located between pairs of the rows and is adapted to transport the goods unloaded by the transport device to a predetermined location along the rows between which the receiving device is located.

INVENTOR
FREDRIK MUNCK

BY Larson and Taylor
ATTORNEYS

SYSTEM FOR TRANSPORTING GOODS TO AND FROM STORAGE SHELVES

The present application is a continuation-in-part of application Ser. No. 707,252 filed on Feb. 21, 1968 now abandoned.

The invention relates to a system for transporting goods such as pallets or containers to and from a storage space located in parallel rows of storage shelves. The system is particularly suited for use in an automatic storage system arrangement.

In accordance with the present invention a simple and practical system is provided whereby pallets, containers and the like may be transported to or removed from a predetermined position in a storage shelf. According to the invention a system is provided for transporting goods to an appropriate shelf space for storage comprising a transport device, guiding means for guiding the longitudinal movement of the transport device along a predetermined path, a first and second series of spaced, parallel rows of shelves located on opposite sides of the guiding means and extending perpendicular thereto, and receiving means, located in a space between a pair of the rows of shelves, for receiving goods from the transport device and for transporting the received goods to appropriate shelf locations. The transport device comprises a base which includes means such as wheels for engaging the guiding means to permit movement of the transport device therealong, platform means for carrying goods, means for raising and lowering said platform means, and means for moving the platform means laterally of the base transversely to the path of movement of the transport device on either side thereof so that goods may be transferred to the receiving means.

The guiding means preferably comprise rails formed by channel members which receive the wheels of the transport device therein.

This system permits the transportation of goods along the rows or racks of the shelves so that the goods can be unloaded at a predetermined shelf or row along the path of the transport device on either side thereof. Lateral movement of the platform means enables the goods to be positioned on the shelf in question and subsequent lowering of the platform or a fork arrangement extending laterally from the platform, permits withdrawal of the platform from the load so that the load remains at rest on the selected shelf and the platform is returned to the initial position thereof on the transport device. The receiving device which is longitudinally movable along the space between the associated rows is adapted to transport the goods to a predetermined storage space located along one of the two rows. The receiving means preferably comprises a forklift truck such as that known by the name "PALSTAK," or a crane.

Other features and advantages of the invention will be set forth in or apparent from the detailed description of a preferred embodiment thereof found hereinbelow.

Thus, reference is made to the drawings wherein.

Figure 1:
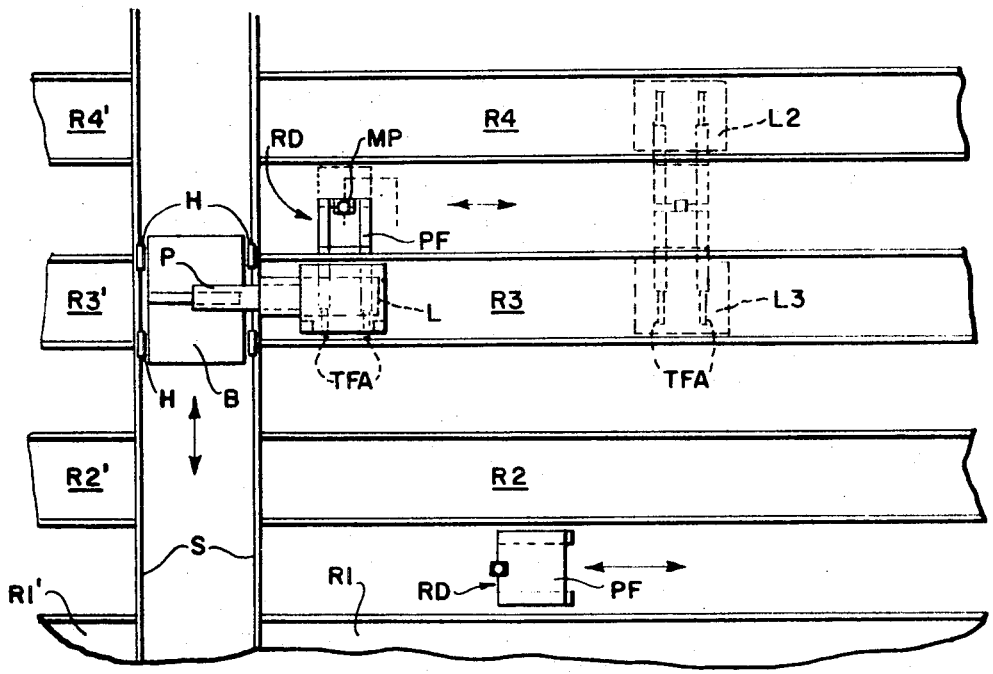
FIG. 1 shows a diagrammatic plan view of a goods transport system in accordance with the present invention.

Referring to FIG. 1, a series of spaced rows of storage shelves denoted R1, R2, R3 and R4 are positioned on one side of a rail arrangement whereas a like series of spaced rows R1', R2', R3', and R4' are positioned on the opposite side of the rail arrangement S. As illustrated, rows R1, R2, R3 and R4 and R1', R2', R3' and R4', extend perpendicular to rails S. Rails S are formed by first and second C-shaped channels which are adapted to receive the wheels H of a carriage B, the wheels H rolling inside of the rails S and thus being well protected.

Figure 2:
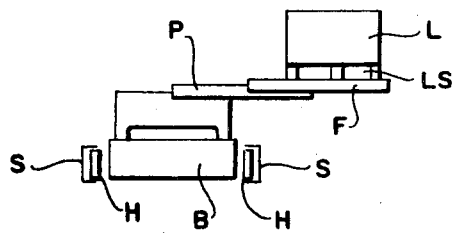
FIG. 2 shows an end view of the transport device and associated load of FIG. 1.
Figure 3:
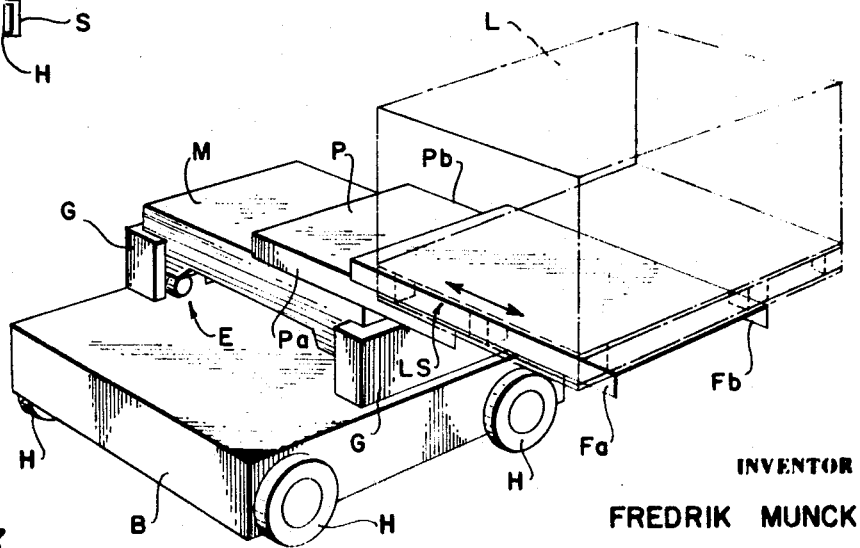
FIG. 3 is a diagrammatic perspective view of the transport device of FIGS. 1 and 2.

Carriage B, as is best seen in FIG. 3, includes a platform P which is movable laterally to one side or the other, one position of platform P being shown in FIG. 2. A telescoping fork arrangement F, shown here as a platformlike structure, is mounted on platform P and is movable laterally with respect thereto. The sides Fa and Fb of fork arrangement F guide the movement thereof along platform P. Platform P is similarly mounted on a mounting member M for lateral movement with respect to mounting member M, side portions Pa and Pb guiding this movement. Mounting member M together with platform P is adapted through an eccentric drive arrangement denoted E to be raised and lowered, upright guide members G mounted on carriage B guiding this vertical movement of mounting member M. It is noted that only a relatively small lifting height H is generally necessary to enable the platform P to discharge a load denoted L onto a suitable receiving platform or other receiving device. The fork arrangement F may conveniently comprise individual telescoping forks (not shown) which engage in spaces LS conventionally provided in pallets to effect lifting thereof, the forks being disengaged from contact with the pallet upon lowering of platform P.

In operation, a load is received on carriage B when platform P and fork arrangement F are in the initial, inboard positions thereof. The carriage B is then moved along rails S to a selected row such as row R3 of FIG. 1. The platform P and fork arrangement F are then moved laterally so that the load is positioned above the end of the selected row. At this time a receiving device RD is used to engage the load and lift it from the platform formed by fork arrangement F or, alternatively form the end of the row where the load is deposited by the transport device B.

Receiving or carrier device RD preferably comprises a forklift truck such as that known as a "PALSTAK." In general, as illustrated in FIG. 1, a receiving device RD includes a platform PF for receiving the goods discharged by carriage B. Platform PF is adapted to be positioned relative to a central mounting post MP in at least the three positions indicated, namely, a first position indicated in solid lines wherein row R3 is serviced, a neutral position, indicated in phantom lines, wherein the platform PF is positioned between rows R3 and R4 and a third position, also indicated in phantom lines, wherein row R4 is serviced. Central mounting post MP may extend between the floor and ceiling of the building in which the system is contained and may include motive means (not shown) mounted thereon for causing movement of receiving device RD along the space between rows R3 and R4. Platform PF includes telescoping fork arms TFA which are adapted to extend outwardly therefrom to engage under and provide lifting of a load L. The actual lifting of the load is accomplished by drive arrangement (not shown) which causes raising and lowering of platform PF relative to central mounting post MP.

It will be appreciated that by locating receiving devices RD between pairs of the shelf rows corresponding to rows R1 to R4 and R1' to R4' a load L may be transferred to any selected shelf space within the pair of rows. For example, as suggested by the load L2 and L3 illustrated in phantom lines, the load placed by carriage B on row R3 can be transported to any shelf space along rows R3 and R4 by the receiving device RD located between these rows.

It will be appreciated that only a section or part of the total shelvstore is shown in the drawing. The overall arrangement preferably includes rails S and associated carriages B at both ends of the rows of shelves so that a transport system is provided which is easily adaptable to various circumstances.

Although the invention has been described in detail with particular reference to a preferred embodiment thereof, it will be understood that variations and modifications can be effected within the scope and spirit of the invention as described hereinabove and as defined in the appended claims.

I claim:

1. A system for transporting goods to an appropriate shelf space for storage comprising a transport device, guiding means for guiding the longitudinal movement of the transport device along a predetermined horizontal path, a first and second series of spaced, parallel rows of shelves located on opposite sides of the guiding means and extending perpendicular thereto, and horizontally movable load handling means, located in a space between a pair of the rows of shelves, for transporting goods to appropriate shelf locations, said load handling means including means for receiving goods from the transport device and for depositing the goods at the shelf locations to which the goods are transported, the transport device comprising base means including means for engaging the guiding means to permit movement of the transport device therealong, platform means for carrying goods, means for raising and lowering said platform means, and means for moving the platform means laterally of the base means transversely to the path of movement of the transport device on either side thereof so that goods may be transferred to the receiving means.

2. A system as claimed in claim 1 wherein said means for raising and lowering said platform comprises eccentric drive means and guide means for guiding the vertical movement of the platform.

3. A system as claimed in claim 2 wherein said platform means includes laterally movable fork means for engaging the goods.

4. A system as claimed in claim 3 wherein a plurality of said receiving means is provided and wherein each said receiving means is capable of transporting goods to either of the two rows between which the said receiving means is located.

5. A system as claimed in claim 3 wherein said platform means includes vertically movable mounting member and a platform laterally movable with respect to said mounting member.

* * * * *